United States Patent
Abhani et al.

(10) Patent No.: US 11,269,524 B2
(45) Date of Patent: Mar. 8, 2022

(54) METHODS AND SYSTEMS FOR MANAGING DATA TRANSFER BETWEEN A UFS HOST AND A UFS TARGET

(71) Applicant: Samsung Electronics Co., Ltd., Suwon-si (KR)

(72) Inventors: Dipak Prafulkumar Abhani, Bengaluru (IN); Rengaraja Sudarmani, Bengaluru (IN); Vasudevan Subramaniam, Bengaluru (IN); Ken Joseph Kannampuzha, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 64 days.

(21) Appl. No.: 16/750,895

(22) Filed: Jan. 23, 2020

(65) Prior Publication Data

US 2021/0103393 A1    Apr. 8, 2021

(30) Foreign Application Priority Data

Oct. 7, 2019    (IN) .............................. 201941040592

(51) Int. Cl.
   *G06F 3/06*    (2006.01)
   *G06F 13/16*    (2006.01)
   *H04L 1/08*    (2006.01)

(52) U.S. Cl.
   CPC .......... *G06F 3/0625* (2013.01); *G06F 3/0659* (2013.01); *G06F 3/0679* (2013.01); *G06F 13/1668* (2013.01); *H04L 1/08* (2013.01)

(58) Field of Classification Search
   CPC .... G06F 3/0625; G06F 3/0659; G06F 3/0679; G06F 13/1668

USPC ......................................................... 711/103
See application file for complete search history.

(56) References Cited

U.S. PATENT DOCUMENTS

| | | | |
|---|---|---|---|
| 7,630,389 B1 * | 12/2009 | Alfieri | .................. H04L 49/901 370/412 |
| 8,700,834 B2 | 4/2014 | Horn et al. | |
| 8,954,655 B2 | 2/2015 | Jean et al. | |
| 9,477,620 B2 | 10/2016 | Kim et al. | |
| 10,891,078 B2 * | 1/2021 | Brief | ..................... G06F 3/0679 |

(Continued)

OTHER PUBLICATIONS

Gagandeep Singh, "Lecture 26: Power Disipation in CMOS Circuits" Oct. 1, 2015, https://nptel.ac.in/content/storage2/courses/117101058/downloads/Lec-26.pdf.

*Primary Examiner* — Christopher B Shin
(74) *Attorney, Agent, or Firm* — Harness, Dickey & Pierce, P.L.C.

(57) ABSTRACT

A method disclosed herein includes transferring, by a Universal Flash Storage (UFS) device, data to a UFS host without checking for first credit information at the UFS host on initiating a read command by the UFS host. The first credit information includes information about an available size of a host UFS Interconnect (UIC) Reception (Rx) buffer of a host UIC module. The method includes transferring, by the UFS host, data to the UFS device based on second credit information received from the UFS device on initiating a write command by the UFS host. The second credit information includes information about a size of a device UIC Rx buffer of a device UIC module, wherein the size of the device UIC Rx buffer is associated with a maximum size defined by a UFS system.

20 Claims, 11 Drawing Sheets

(56) References Cited

U.S. PATENT DOCUMENTS

| | | | |
|---|---|---|---|
| 2014/0310469 A1* | 10/2014 | Machnicki | G06F 12/0828 |
| | | | 711/123 |
| 2017/0102893 A1 | 4/2017 | Yoon et al. | |
| 2017/0177491 A1* | 6/2017 | Seo | H04L 49/90 |
| 2019/0129656 A1* | 5/2019 | Bains | G06F 3/0659 |
| 2019/0303304 A1* | 10/2019 | Lee | G06F 12/1441 |
| 2019/0391761 A1* | 12/2019 | Brief | G06F 3/0656 |
| 2020/0050366 A1* | 2/2020 | Bavishi | G06F 12/0246 |
| 2020/0278806 A1* | 9/2020 | Hsieh | G06F 3/0679 |
| 2021/0042257 A1* | 2/2021 | Jang | G06F 13/4234 |
| 2021/0064532 A1* | 3/2021 | Park | G06F 13/1673 |
| 2021/0133111 A1* | 5/2021 | Lee | G06F 9/505 |

\* cited by examiner

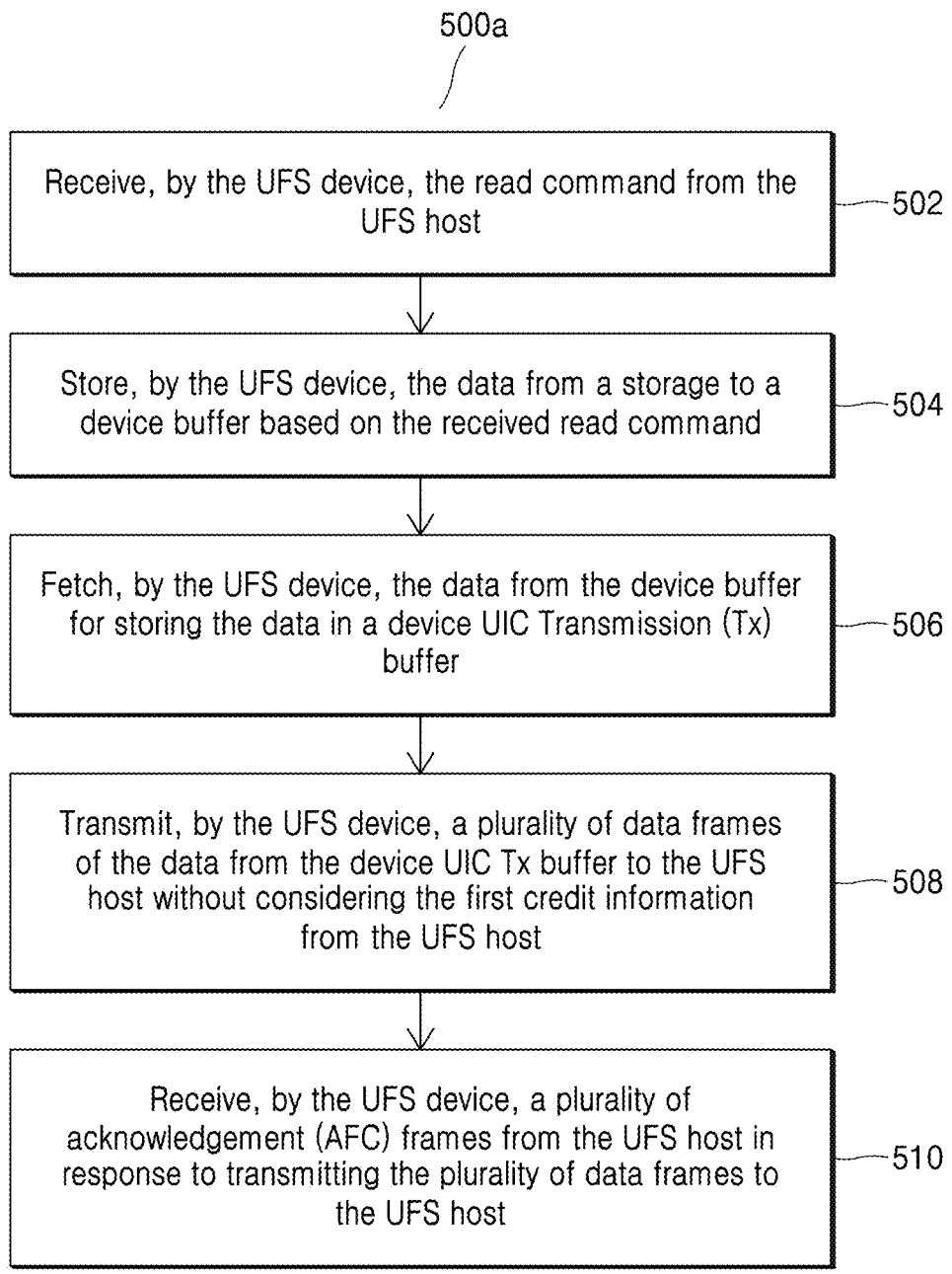

METHODS AND SYSTEMS FOR MANAGING DATA TRANSFER BETWEEN A UFS HOST AND A UFS TARGET

CROSS-REFERENCE TO RELATED APPLICATIONS

This application claims benefit of priority to Indian Patent Application No. 201941040592, filed on Oct. 7, 2019 in the Indian Intellectual Property Office, the disclosure of which is incorporated herein by reference in its entirety.

TECHNICAL FIELD

Example embodiments relate to a Universal Flash Storage (UFS) system, and more particularly to managing data transfer between a UFS device and a UFS host by reducing power consumption.

BACKGROUND

A Universal Flash Storage (UFS) system is a flash memory system defined by the Joint Electron Device Engineering Council (JEDEC) standard for high data transfer speed. The UFS system includes a UFS device which may be embedded with a UFS host such as a processor, a System on Chip (SoC), an electronic device, etc.

The UFS host initiates a read command to the UFS device in order to fetch data from the UFS device. Upon receiving the read command, a device application of the UFS device reads data from an associated storage, and submits the data to a device UFS Interconnect (UIC) layer. The device UIC layer checks for available credit information at a host UIC layer for sending the data to the UFS host. The credit information includes information about the buffer space available at the UFS host UIC layer.

Based on the credit information, the device UIC layer transmits the data to the host UIC layer. As the application on the UFS host generally reads the data faster from the host UIC layer, the available credit information at the host UIC layer may not be updated to the device UIC layer immediately. Thus, more time may be required and/or utilized for performing the read transaction. Further, the available credit information received by the device UIC layer from the host UIC layer is often pessimistic, underestimating or undervaluing the amount of buffer space availability, not reflecting an actual or true amount of buffer space availability. This creates a more conservative view of the buffer space availability. Furthermore, because of the pessimistic credit information, the data may be held at the UFS device even though buffer space is available at the UFS host UIC layer.

Additionally, the UFS host initiates a write command to the UFS device for writing data to the UFS device. Upon receiving the write command, the device application allocates a buffer space to store write data from the UFS host and sends a Ready To Transfer (RTT) response to the UFS host. Based on the received RTT response, the UFS host sends the data to the device UIC layer. The device UIC layer passes the data to the device application and updates the credit information, e.g. the available buffer space at the UFS device UIC layer. However, the updating of the credit information may be delayed, and the updated credit information often does not reflect an actual amount of the buffer space availability. In addition, the UFS host may be blocked from transmitting the data to the UFS device due to the delay in the reception of the updated credit information from the device UIC layer.

Thus, data transfer between the UFS host and the UFS device using the credit information results in increased power consumption and time consumption, which further impacts the performance of the UFS system.

SUMMARY

Some non-limiting example embodiments disclosed herein provide methods and/or systems for managing data transfer between a Universal Flash Storage (UFS) host and a UFS device with low power consumption.

Some non-limiting example embodiments disclosed herein provide methods and/or systems for transferring data by the UFS device to the UFS host without checking for a first credit information at the UFS host, wherein the first credit information includes an available size of a host UFS host Interconnect (UIC) Reception (Rx) buffer.

Some non-limiting example embodiments disclosed herein provide methods and systems for transferring data by the UFS host to the UFS device based on a second credit information received from the UFS device, wherein the second credit information includes or is associated with a maximum size of a device UIC Rx buffer specified by a UFS system.

A method disclosed herein includes transferring read data to the UFS host in response to a read command from the UFS host, the read data transferred to the host being the same regardless of whether first credit information is received with the read command; and receiving write data associated with a write command received from the UFS host, the receiving based on second credit information sent by the UFS device A Universal Flash Storage (UFS) system includes a UFS host, and a UFS device. The UFS device is configured to transfer read data to the UFS host upon receipt of a read command from the UFS host, the read data being the same regardless of whether first credit information is sent from the UFS host with the read command. The UFS host is configured to transfer write data to the UFS device based on second credit information received from the UFS device, the write data associated with a write command sent from the UFS host.

These and other example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of some example embodiments herein without departing from the spirit thereof, and some example embodiments herein include all such modifications.

BRIEF DESCRIPTION OF THE FIGURES

Embodiments herein are illustrated in the accompanying drawings, throughout which like reference letters indicate corresponding parts in the various figures. The embodiments herein will be better understood from the following description with reference to the drawings, in which:

FIG. 5A is a flow diagram illustrating a method for performing the read transaction between the UFS host and the UFS device with reduced power consumption, according to example embodiments;

DETAILED DESCRIPTION OF EXAMPLE EMBODIMENTS

Figure 1:
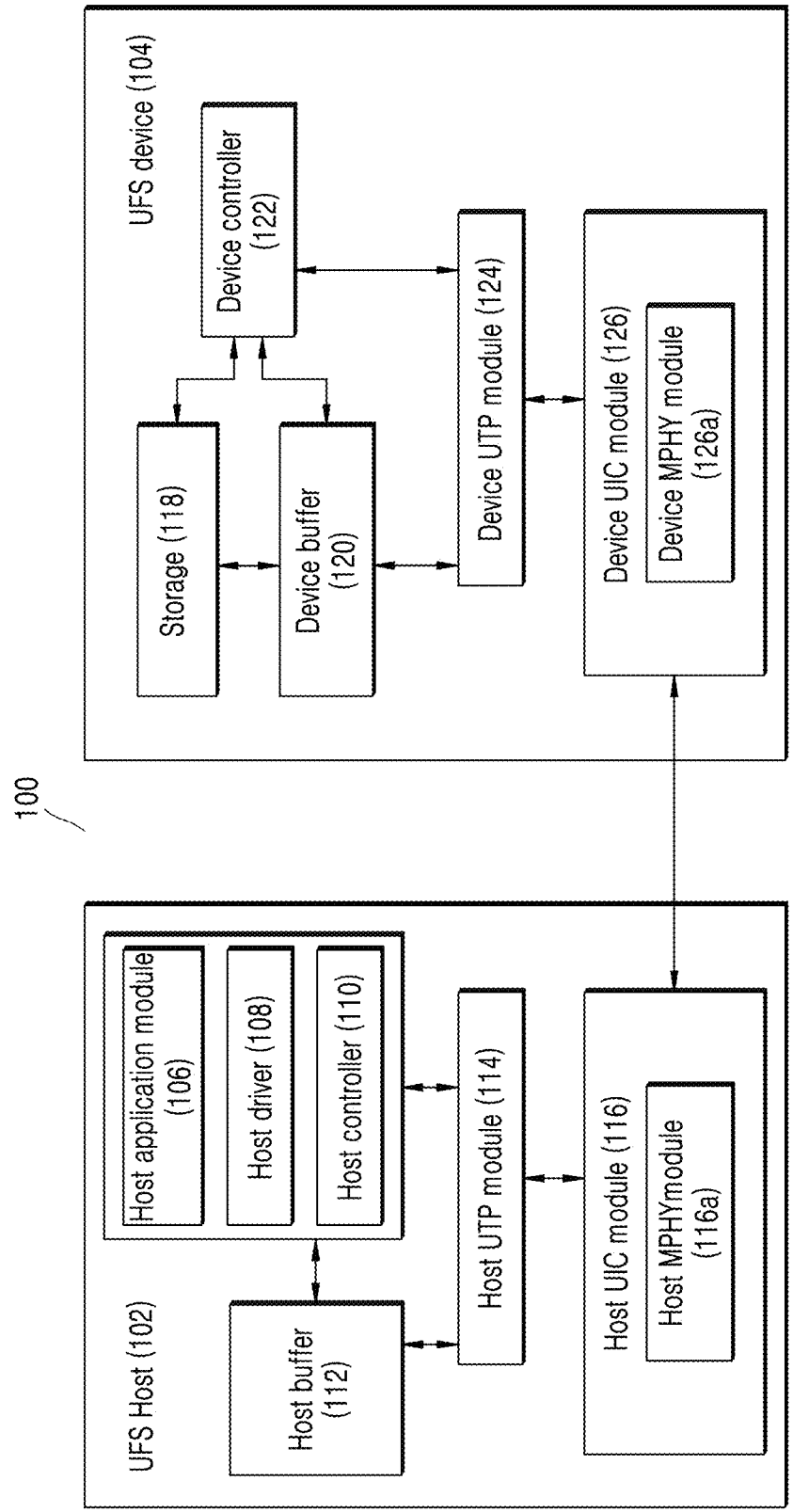
FIG. 1 illustrates an example architecture of a Universal Flash Storage (UFS) system, according to some example embodiments.

Some example embodiments herein and the various features and/or details, including advantageous details, thereof are explained more fully with reference to the non-limiting embodiments that are illustrated in the accompanying drawings and detailed in the following description. Descriptions of some components and processing techniques, such as some well-known components and processing techniques, may be omitted for brevity. The description herein is intended to facilitate an understanding of ways in which some example embodiments herein can be practiced, and/or to further enable those of ordinary skill in the art to practice some example embodiments herein. Accordingly, this disclosure should not be construed as limiting the scope of example embodiments herein.

Embodiments herein disclose methods and/or systems for managing data transfer between a Universal Flash Storage (UFS) host and a UFS device, with low power consumption. Referring now to the drawings, and more particularly to FIGS. 1 through 6C, where similar reference characters denote corresponding features consistently throughout the figures, there are shown example embodiments.

FIG. 1 illustrates an example architecture of a Universal Flash Storage (UFS) system 100, according to some example embodiments. The UFS system 100 is or includes a UFS memory storage system operating according to UFS specification defined by the Joint Electron Device Engineering Council (JEDEC) standard for high data transfer speed.

The UFS system 100 includes a UFS host 102 and a UFS device 104. Examples of the UFS host 102 referred herein can be, but are not limited to, a processor, a System on Chip (SoC), a server, an integrated chip (IC), a mobile computing device, a mobile phone, a smartphone, a tablet, a phablet, a personal digital assistant (PDA), a laptop, a computer, a wearable device, an IoT (Internet of Things) device, a wearable computing device, a vehicle infotainment system, a medical device, a camera, an application processor (AP), a multiprocessor system, a microprocessor based programmable consumer electronics, a network computer, a minicomputer, a mainframe computer, and/or any other device which supports the UFS device 104. The UFS device 104 herein may refer to a storage device including a non-volatile memory. The UFS host 102 and the UFS device 104 may communicate using a Unified Protocol (UniPro) and MPHY.

The UFS host 102 may include an application module/driver/controller 146 including a host application module 106, a host driver 108, a host controller 110. The UFS host 102 may also include a host buffer 112, a host UFS Transport Protocol (UTP) module 114 and a UFS host Interconnect (UIC) module 116. The host application module 106 may include application programs/computer instructions to operate the UFS host 102. The host driver 108 may be configured to control the peripheral devices (for example, the UFS device 104) connected to the UFS host 102, and/or to provide functions of controlling the peripheral devices to the host application module 106. The host controller 110 may be configured to communicate with the UFS device 104. The host controller 110 may be controlled by the host driver 108. The host buffer 112 can be used as a memory, e.g. a main memory and/or a cache memory for storing data fetched from the UFS device 104.

The host UTP module 114 may support functionalities of a UTP layer, which can be a transport layer that interfaces the applications included in the host application module 106 and a UIC layer supported by the host UIC module 116. The host UIC module 116 may support functionalities of the UIC layer. The UIC layer can be, or correspond to, a link layer for the UFS system 100 that interacts with the UTP layer supported by the UTP module 114 and a physical layer (PHY layer) for the data transfer. The host UIC module 116 can include a host UIC Reception (Rx) buffer 112a for storing the data received from the UFS device 104. The host UIC module 116 can include a host UIC Transmission (Tx) buffer 112b for storing the data that needs to be transmitted to the UFS device 104. The host UIC module 116 includes a host physical module 116a for establishing a communication between the UFS host 102 and the UFS device 104.

In some example embodiments, the host physical module 116a can be implemented as Mobile Industry Processor Interface (MIPI) MPHY and/or DPHY, and can be referred herein as a host MPHY module or host DPHY module 116a. The host MPHY module 116a includes a transmission unit (not shown) for sending the data from the UFS host 102 to the UFS device 104 and a reception unit (not shown) for receiving the data by the UFS host 102 from the UFS device 104.

The UFS device 104 includes a storage 118, a device buffer 120, a device controller 122, a device UTP module 124 and a device UIC module 126. The storage 118 may be configured to perform operations such as, but not limited to, a write data, a read data, an erase data, and/or other operations. Examples of the storage 118 referred herein can be, but is not limited to, a flash memory, a Magnetic Random Access Memory (MRAM), a Phase change RAM (PRAM), a Ferroelectric RAM (RFAM), a NAND Flash memory and/or any other non-volatile memory. The storage device 118 may include homogenous storage or may include heterogeneous storage. The device buffer 120 may be a temporary memory containing the data to be stored in the storage 118. The device controller 122 can be configured to control the operations of the storage 118 and/or device buffer 120.

The device UTP module 124 operates by supporting functionalities of the UTP layer. The device UTP module 124 can be configured to submit the data from a device application module (not shown) to the device buffer 120. The device UTP module 124 may be configured to submit the data from the device buffer 120 to the device application module.

The device UIC module 126 can support functionalities of the UIC layer. The device UIC module 126 can include a device UIC Rx buffer 120*a* for storing the data received from the UFS host 102. The device UIC module 126 can include a device UIC Tx buffer 120*b* for storing the data that needs to be transmitted to the UFS host 102. The device UIC module 126 further includes a device physical module 126*a* for establishing a communication between the UFS host 102 and the UFS device 104. In some example embodiments, the device physical module 126*a* can be implemented as Mobile Industry Processor Interface (MIPI) MPHY and/or DPHY and can be referred herein as a device MPHY module and/or device DPHY module 126*a*. The device MPHY module 126*a* includes a transmission unit (not shown) for sending the data from the UFS device 104 to the UFS host 102 and a reception unit (not shown) for receiving the data by the UFS device 104 from the UFS host 102.

For accessing the UFS device 104, the host application module 106 on the UFS host 102 initiates a command for performing at least one of a read transaction or a write transaction. The command can be at least one of a read command or a write command. The host controller 110 transmits the command initiated by the host application module 106 to the host UIC module 116, that further submits to the host MPHY module 116*a*. The host MPHY module 116*a* transmits the command to the device MPHY module 126*a*, which further transmits the command to the device UIC module 126. The device controller 122 receives the command from the device UIC module 126 and identifies the command. The device controller 122 identifies the command, for example based on an operation code (opcode) field in the command.

Upon identifying that the command includes the read command, the device controller 122 fetches read data, e.g. the data requested by the UFS host 102, from storage 118, and passes the fetched data to the device buffer 120. The device controller 122 instructs the device UTP module 124 to transmit the read data to the UFS host 102. The device UTP module 124 fetches the data frames of the read data from the device buffer 120, and stores the fetched data frames in the device UIC Tx buffer 120*b* of the device UIC module 126.

The device UIC module 126 fetches the data frames from the device UIC Tx buffer 120*b*, and transmits the fetched data frames to the UFS host 102 through the device MPHY module 126*a*. In some example embodiments, the device UIC module 126 transmits the data frames to the UFS host 102, without checking for a first credit information from the UFS host UIC module 116. The first credit information includes, for example, information about an available size/space of the host UIC Rx buffer 112*a* corresponding to/associated with the host UIC module 116 (at the UFS host 102), which is used for storing the data frames received from the UFS device 104. Embodiments herein use the terms such as "first credit information", "available credit information", "available size/space of the host UIC Rx buffer 112*a*", "free host memory buffer space," etc. to refer to the currently available size of the host UIC Rx buffer 112*a* corresponding to/associated with the host UIC module 116. Further, the device UIC module 126 transmits the data frames to the UFS host 102 until all the data frames stored in the device UIC Tx buffer 120*b* are transmitted to the UFS host 102. Thus, the UFS device 104 may complete the transaction faster, which may further power consumption.

In some example embodiments, during the transmission of the data frames from the UFS device 104 to the UFS host 102, the host UIC module 116 may determine that the host UIC Rx buffer 112*a* cannot or may not store the data frame(s), as the memory buffer space does not have sufficient space to store the data. Then, the host UIC module 116 generates a Negative Acknowledgement (NAK) for the data frame(s), and sends the NAK to the UFS device 104. Upon receiving the NAK, the device UIC module 126 may re-transmit the data frame(s), from which the NAK is received, to the UFS host 102.

When the device application module of the UFS device 104 identifies that the command received from the UFS host 102 includes a write command, the device UTP module 124 sends a Ready To Transfer (RTT) response to the UFS host 102 using the device UIC module 126. Upon receiving the RTT response, the host UTP module 114 fetches write data, which is to be transmitted to the UFS device 104, of the host application module 106 from the host buffer 112. The host UTP module stores the write data in the host UIC Tx buffer 112*b*. The host UIC module 116 fetches data frames of the write data from the host UIC Tx buffer 112*b*, and forwards the data frames to the host MPHY module 116*a* for sending to the UFS device 104. In some example embodiments, in response to receiving the data frames from the UFS host 102, the device UIC module 126 of the UFS device 104 sends a second credit information to the UFS host 102. In some example embodiments, the second credit information includes a specific size, e.g. a pre-defined size of the device UIC Rx buffer 120*a*. The pre-defined size indicates, corresponds to, and/or is associated with, a maximum size of the device UIC Rx buffer 120*a* defined by the UFS system according to UFS specification supported by the UFS system 100. The pre-defined size of the device UIC Rx buffer 120*a* may vary based on the UFS specification supported by the UFS system 100. The second credit information does not consider the information about currently available size/space of the device UIC Rx buffer 120*a* associated with the device UIC module 126. Embodiments herein use the terms such as "second credit information", "complete credit information", "full credit information", "maximum credit information", "pre-defined size/space of the device UIC Rx buffer 120*a*," etc. to refer to, correspond to, and/or be associated with, a maximum size of the Rx buffer 120*a* defined by the UFS system 100 according to the supported UFS specification. The device UIC module 126 transmits the maximum/second credit information to the UFS host 102, instead of calculating available credit information for the device buffer 120, e.g. the available size of the device UIC Rx buffer 120*a*. The host UIC module 116 can transmit remaining data frames of the write data to the UFS device 104 upon receiving the second credit information from the device UIC module 126 of the UFS device 104. Thus, the UFS host 102 may complete the transaction faster, which may further reduce power consumption.

In some example embodiments, during the transmission of the data frames from the UFS host 102 to the UFS device 104, the device UIC module 126 may determine that the device UIC Rx buffer 120*a* of the device memory buffer 120 is not available, e.g. is full, for storing the received data frame(s). Then, the device UIC module 126 generates a Negative Acknowledgement (NAK) for the data frame(s) and sends the NAK to the UFS host 102. Upon receiving the NAK, the host UIC module 116 may re-transmit the data frame(s) from which the NAK is received to the UFS device 104.

FIG. 1 shows example units of the UFS system 100, but it is to be understood that inventive concepts are not limited thereto. For example, the UFS system 100 may include less or more number of units. Further, the labels or names of the units are used only for illustrative purpose and are not intended to limit the scope of the embodiments herein. One or more units can be combined together to perform same or substantially similar function in the UFS system 100.

Figure 2A:
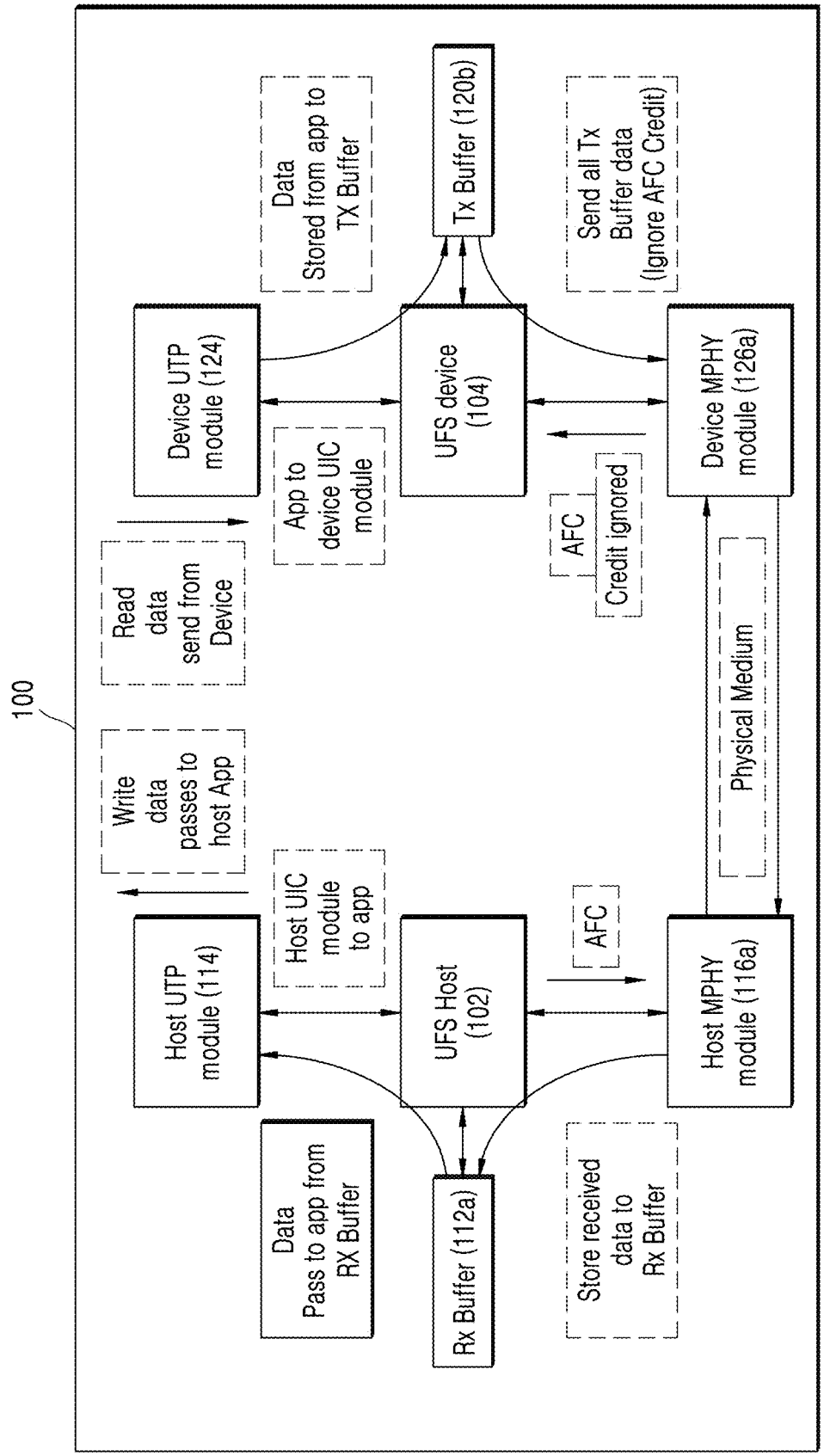
FIG. 2A illustrates the UFS system, wherein a UFS device transmits data to a UFS host without checking for an available credit information/first credit information, according to some example embodiments.

FIG. 2A illustrates the UFS system 100, wherein the UFS device 104 transmits the data to the UFS host 102 without checking for the available credit information, according to some example embodiments.

For reading the data from the UFS device 104, the host application module 106 initiates a read command. The host application module 106 submits the read command to the host UIC module 116 through the host UTP Module 114. The host MPHY module 116a of the host UIC module 116 transmits the read command to the device MPHY module 126a of the UFS device 104. The device MPHY module 126a forwards the read command to the device UIC module 126, and from the UIC module, the read command is forwarded to device UTP module 124, which further transfers to the device controller 122. Upon receiving the read command, the device controller 122 initiates a read process from storage 118 by fetching the read data from the storage 118, and storing the fetched read data in the device buffer 120. The device controller 122 further instructs the device UTP module 124 to transmit the read data to the UFS host 102. The device UTP module 124 fetches the read data from the device buffer 120 and stores the read data in the device UIC Tx buffer 120b of the device UIC module 126, and instructs the device UIC module 126 to transfer the read data to the UFS host 102. The device UIC module 126 further fetches the data frames of the read data from the device UIC Tx buffer 120b, and sends the fetched data frames to the device MPHY module 126a without checking for the available credit information of the host UIC Rx buffer 112a at the host UIC module 116. The device MPHY module 126a further transmits the data frames to the host MPHY module 116a.

Within the UFS host 102, the host UIC module 116 stores the data frames received by the host MPHY module 116a in the host UIC Rx buffer 112a. The host UTP module 114 further fetches the data frames from the host UIC Rx buffer 112a, and passes the data frames to the host buffer 112, indicating to the host application module 106 regarding the data availability. After transferring the data frames by the host UTP module 114 from the host UIC Rx buffer 112a to the host buffer 112, the host UIC module 116 generates acknowledgement (AFC) frames for the received data frames. The AFC frames include information such as, but not limited to, a frame sequence number and/or the first/available credit information. In some example embodiments, the available credit information included in AFC frames will be ignored by the device UIC module 126. The host UIC module 116 sends the AFC frames to the host MPHY module 116a for sending the AFC frames to the device MPHY module 126a. Based on the AFC frames received from the UFS host 102, the device UIC module 126 removes the successfully transmitted data frames from the device UIC Tx buffer 120b. As the device UIC module 126 ignores the credit information from the UFS host UIC module 116 during the read transaction, data transmission links and AFC transmission links can be operated at different speeds, in an asymmetric mode, to save power consumption, without impacting or significantly impacting the performance of the UFS system.

In some example embodiments, as the host UTP module 114 performs the data transfer from the host UIC Rx buffer 112a to the host buffer 112, the host UIC module 116 may send the AFC frames with the previous available credit information to the UFS device 104 immediately after receiving the data frames from the UFS device 104. The host UIC module 116 may send the AFC frames to the UFS device 104 after receiving a specified (or, alternatively, pre-determined) number of data frames from the UFS device 104. The host UIC module 116 may also send the AFC frames to the UFS device 104 upon expiry of a timer associated with the UFS host 102. The host UIC module 116 may also send the AFC frames to the UFS device 104 upon determining that a difference of an available credit and a send credit information exceeds a specific (or, alternatively, pre-defined) AFC credit threshold. The AFC credit threshold may be pre-defined according to the specification supported by the UFS system 100.

The host UIC module 116 can transmit grouped AFC frames to the UFS device 104, where grouping is performed according to a specification that is defined by the host UIC module. The grouped AFC frames can be transmitted to the UFS device 104 based on at least one of receipt of the specified and/or pre-determined number of data frames, an expiry of the timer associated with the UFS host 102, or the available credit size when the available credit size exceeds the threshold. The transmission of the grouped AFC frames to the UFS device 104 saves the number of AFC frames transmissions, which in turn may reduce the power consumption.

As a non-limiting example embodiment for illustrative purposes only, suppose the UFS host 102 is to read 100 data frames from the UFS device 104. Further, fifty data frames can be stored in the host UIC Rx buffer 112a. In order to read 100 data frames, the UFS host 102 sends the read command to the UFS device 104. Upon receipt of the read command, the UFS device 104 initially transmits fifty data frames to the UFS host 102. Further, the UFS device 104 may transmit the remaining data, e.g. the fifty frames, to the UFS host 102 without checking for the available size, e.g. the credit information, of the host UIC Rx buffer 112a. Upon receiving the data frames from the UFS device 104, the UFS host 102 generates AFC frames for the read data. For example, if the UFS host 102 received fifty data frames, then the UFS host 102 generates fifty AFC frames for the corresponding fifty data frames. Further, the AFC frames may include the frame sequence number. For example, if the UFS host 102 receives the fifth data frame, then the AFC may include the frame sequence number as five in the AFC generated for the fifth data frame. The AFC frames may or may not include the available credit information. For example, the AFC frame generated for the fifth data frame, a sixth data frame, and a seventh data frame may not include the available credit information. Further, the UFS host 102 may transmit the AFC frames to the UFS device 104 based on at least one of reception of the specified (or, alternatively, pre-determined) number of data frames, the expiry of the timer associated with the UFS host 102, or the available credit size, when the available credit size exceeds the threshold. For example, the UFS host 102 may send fifty AFC frames, corresponding to the fifty data frames, to the UFS device 104 after receiving a fiftieth data frame. The UFS host 102 may group the AFC frames for sending to the UFS device 104. The UFS host 102 may transmit a single AFC frame with appropriate frame sequence number indication when grouping is enabled. For example, the UFS host 102 may transmit a single AFC with frame sequence number equal to sixteen if a grouping of sixteen is enabled. The UFS host 102 may also transmit the single AFC frame to the UFS device 104 after processing the sixteenth data frame from the UFS device 104.

Figure 2B:
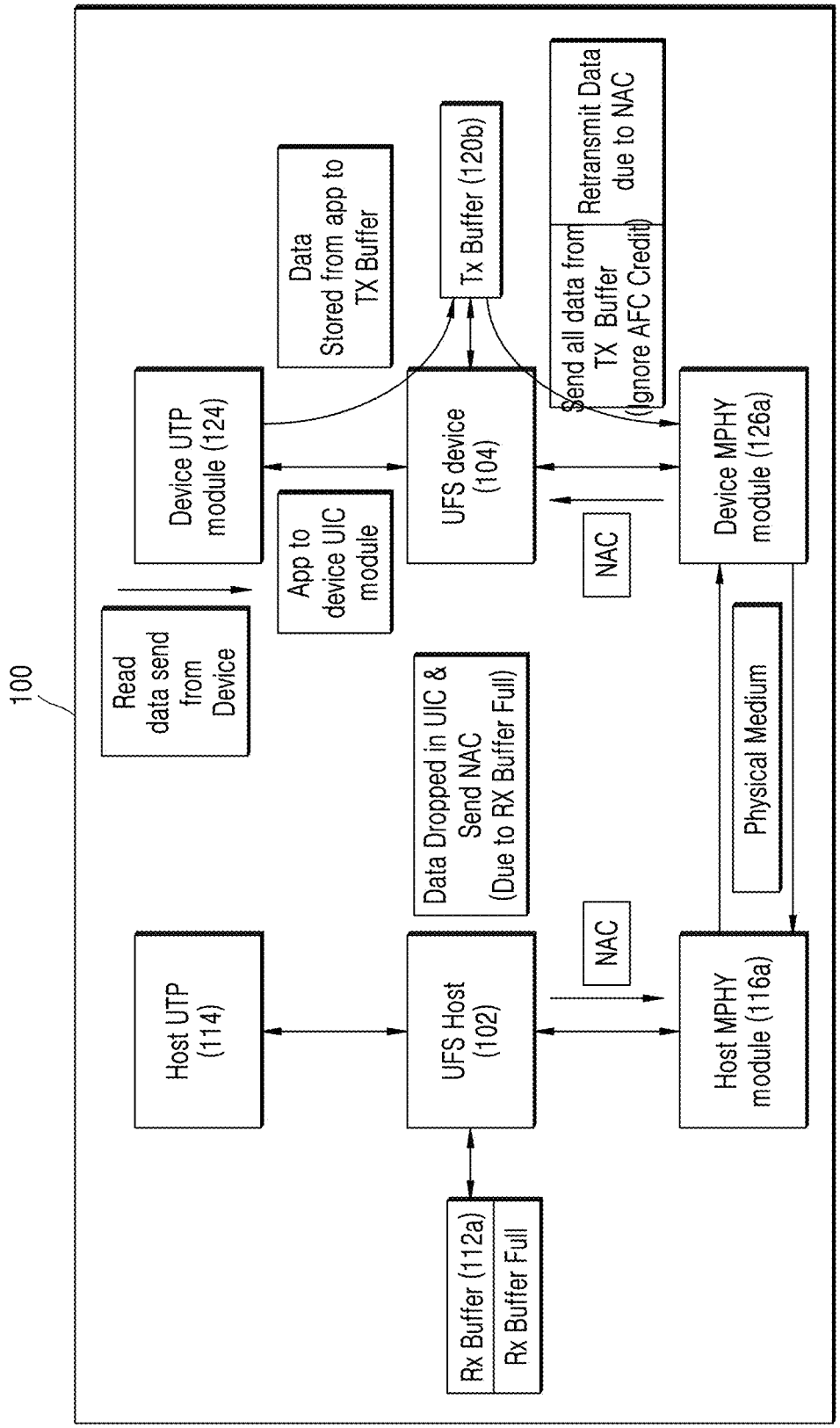
FIG. 2B is an example architecture of the UFS system illustrating a read transaction performed between the UFS host and the UFS device in case of unavailability of a host buffer, according to some example embodiments.

FIG. 2B is an example architecture of the UFS system 100 illustrating the read transaction performed between the UFS host 102 and the UFS device 104 in case of unavailability of the host UIC Rx buffer 112a, according to example embodiments.

Upon receipt of the read command from the UFS host 102, the device UTP module 124 stores the read data fetched from the storage 118 in the device UIC Tx buffer 120b of the device buffer 120. The device UIC module 126 further fetches the data frames of the read data from the device UIC Tx buffer 120b and sends the data frames to the device MPHY module 126a, without checking for the available credit information at the host UIC module 116. The device MPHY module 126a further transmits the data frames to the host MPHY module 116a.

Within the UFS host 102, the host UIC module 116 receives the data frames from the host MPHY module 116a and stores the data frames in the host UIC Rx buffer 112a. Upon determining that the host UIC Rx buffer 112a is full and/or not available, the host UIC module 116 drops the data frames that cannot be stored in the host UIC Rx buffer 112a. Further, the host UIC module 116 sends the NAK for the dropped data frames to the host MPHY module 116a. The host MPHY module 116a transmits the NAK to the device MPHY module 126a. The device UIC module 126 receives the NAK from the device MPHY module 126a and identifies the dropped data frames. Further, the device UIC module 126 re-transmits the data frames, starting from the last AFC received. Within the UFS host 102, the host UIC module 116 obtains the re-transmitted data from the host MPHY module 116a, and stores the obtained data frames in the host UIC Rx buffer 112a.

As a non-limiting example, suppose the UFS device 104 sends fifteen data frames to the UFS host 102. Within the UFS host 102, the host UIC module 116 stores fourteen data frames in the host UIC Rx buffer 112a and sends AFC for all fourteen frames. The host UIC module 116 drops the fifteenth data frame upon determining that the host UIC Rx buffer 112a is full. Further, the host UIC module 116 transmits the NAK for the fifteenth data frame to the UFS device 104. Upon receiving the NAK, the UFS device 104 re-transmits the fifteenth data frame to the UFS host 102.

Figure 3A:
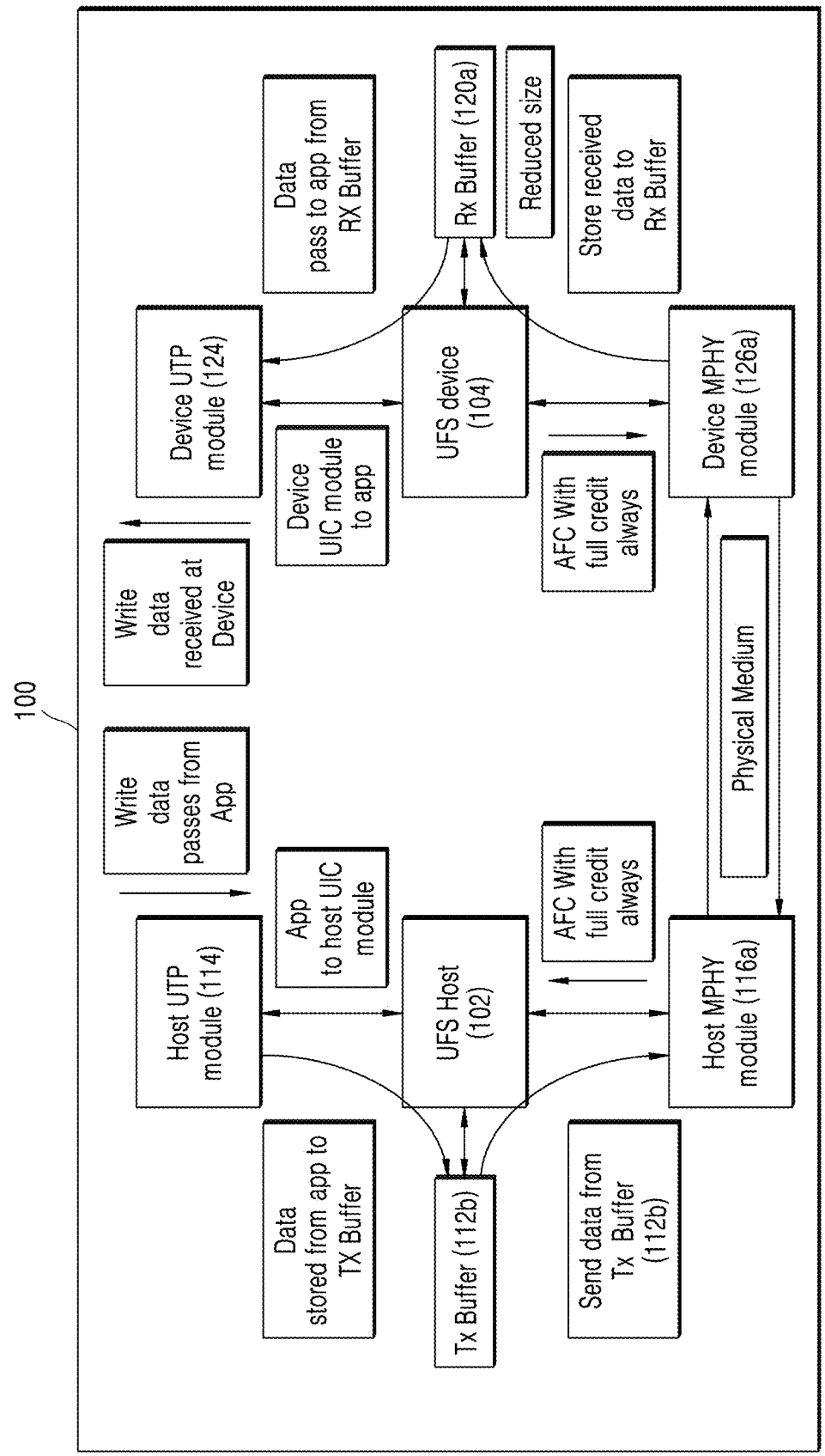
FIG. 3A illustrates the UFS system, wherein the UFS host transmits data to the UFS device upon receiving a second credit information from the UFS device, according to some example embodiments.

FIG. 3A illustrates the UFS system 100, wherein the UFS host 102 transmits the data to the UFS device 104 upon receiving the second credit information from the UFS device 104, according to example embodiments.

Upon writing the data to the UFS device 104, the host application module 106 initiates the write command. The host application module 106 submits the write command to the host UIC module 116 through the host UTP module 114. The host MPHY module 116a of the host UIC module 116 transmits the write command to the device MPHY module 126a of the UFS device 104. The device MPHY module 126a forwards the write command to the device UTP module 124 through the device UIC module 126. Upon receiving the write command, the device UTP module 124 generates the RTT response, and passes the generated RTT response to the device MPHY module 126a through the device UIC module 126. The device MPHY module 126a further transmits the RTT response, corresponding to the write command, to the host MPHY module 116a. The host UIC module 116 receives the RTT response from the host MPHY module 116a, and forwards the received RTT response to the host UTP module 114 through the host UIC module 116. Upon receiving the RTT response, the host UTP module 114 stores the write data to be transmitted to the UFS device 104, fetched from the host application module 106, in the host UIC Tx buffer 112b of the host buffer 112. The host UIC module 116 fetches the data frames of the write data from the host UIC Tx buffer 112b, and forwards the fetched data frames to the host MPHY module 116a. The host MPHY module 116a transmits the received data frames to the device MPHY module 126a.

Within the UFS device 104, the device UIC module 126 receives the data frames from the device MPHY module 126a and stores the fetched data frames in the device UIC Rx buffer 120a of the device buffer memory 120. Further, the device UTP module 124 fetches the data frames from the device UIC Rx buffer 120a, and passes the fetched data frames to the device application module, which further instructs the device controller 122 to write the data frames to the storage 118.

After reading the data frames by the device UTP module 124 from the device UIC Rx buffer 120a, the device UIC module 126 generates the AFC frames for the received data frames. The AFC frames include a frame sequence number with the second credit information. The second credit information does not consider the currently available size of the device UIC Rx buffer 120a, but may indicate a value corresponding to and/or associated with the maximum credit specified by the UFS specification supported by the UFS system 100. Thus, the AFC frames with the second credit information may eliminate a need and/or a requirement of the device UIC module 126 to determine the available size of the device UIC Rx buffer 120a before transmitting each AFC frame to the UFS host 102. Further, the device UIC module 126 sends the AFC frames to the device MPHY module 126a for sending the AFC frames to the host MPHY module 116a. Based on the AFC frames received from the UFS device 104, the host UIC module 116 removes the transmitted data frames from the host UIC Tx buffer 112b.

The device UIC module 126 may send the AFC frames to the UFS host 102 after receiving a specific (or, alternatively, pre-determined) number of data frames, as defined for example in the specification supported by the UFS system 100, from the UFS host 102. The device UIC module 126 may also send the AFC frames to the UFS host 102 after expiry of a timer associated with the UFS device 104.

The device UIC module 126 groups the AFC frames and transmits the grouped AFC frames to the host UIC module 116. The grouped AFC frames can be transmitted to the host UIC module 116 based on reception of the specified/pre-determined number of data frames and/or an expiry of the timer associated with the UFS device 104. Thus, transmitting of the grouped AFC frames to the UFS host 102 saves a number of AFC frames transmissions, which in turn may reduce the power consumption.

As a non-limiting example, suppose the UFS host 102 is to write 100 data frames to the UFS device 104. In order to write the data to the UFS device 104, the UFS host 102 sends the write command to the UFS device 104, and receives the RTT response from the UFS device 104 for the write command. Upon receiving the RTT response, the UFS host 102 initially transmits fifty data frames to the UFS device 104. In response to the transmission of fifty data frames, the UFS host 102 receives fifty AFC frames from the UFS device 104. The received AFC frames may include the second credit information. In an example herein, the AFC frames may include the maximum credit, even after receiving fifty data frames. Since the UFS device 104 includes the second credit information in the AFC frames, the credit calculation is not required at the UFS device 104. Thus, the UFS device 104 may send the AFC frames faster to the UFS host 102. Further, as the UFS host 102 receives the AFC frames faster, the UFS host 102 completes the write data transfer faster. Thus, the write transaction may be performed without additional delay and/or with reduced power consumption.

Figure 3B:
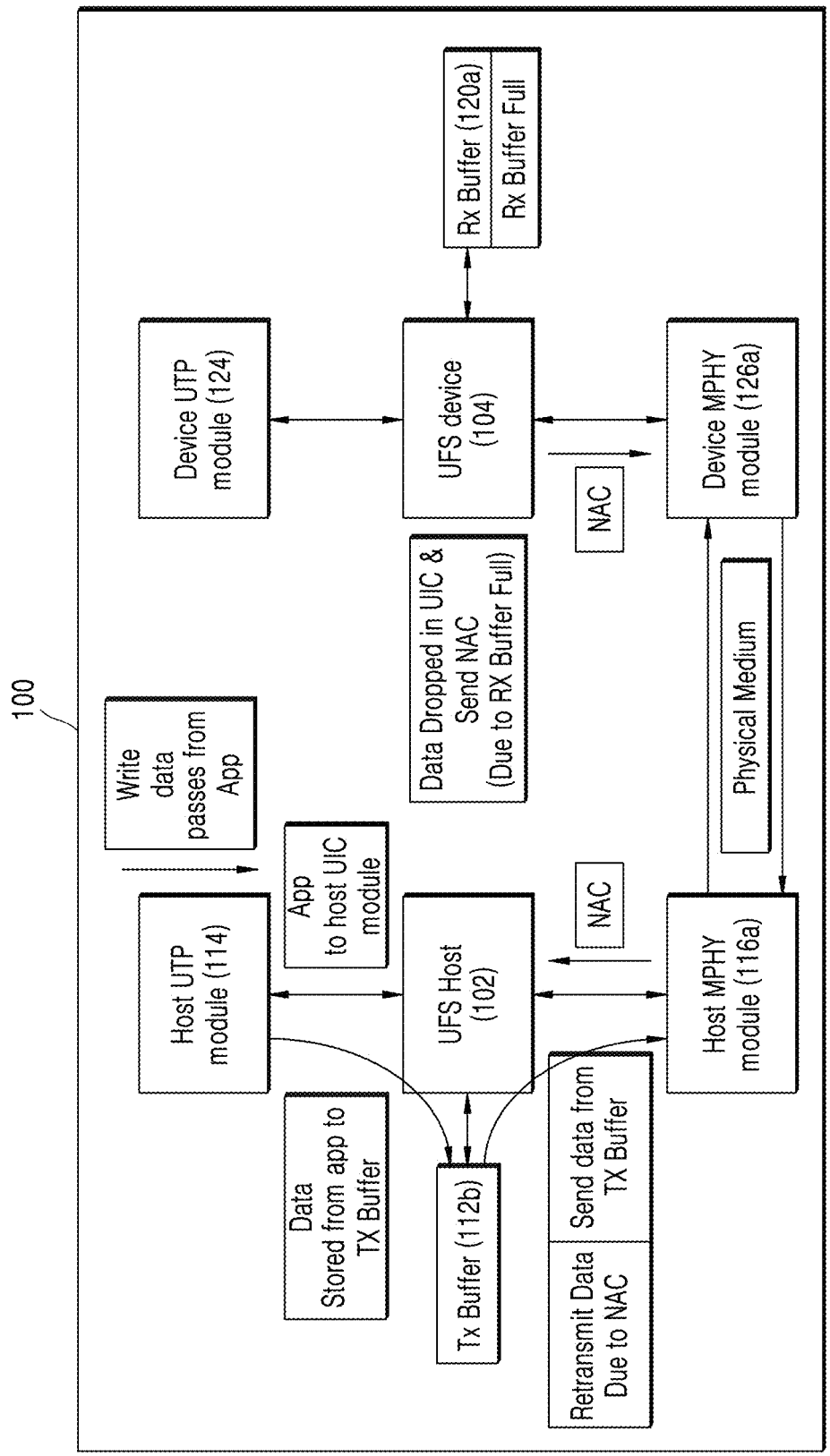
FIG. 3B is an example architecture of the UFS system illustrating a write transaction performed between the UFS host and the UFS device in case of unavailability of a device buffer, according to example embodiments.

FIG. 3B is an example architecture of the UFS system 100 illustrating the write transaction performed between the UFS host 102 and the UFS device 104 in case of unavailability of the device UIC Rx buffer 120a of the device buffer memory 120, according to some example embodiments.

Upon receiving the RTT response corresponding to the write command from the UFS device 104, the host UTP module 114 stores the write data fetched from the host application module 106 in the host UIC Tx buffer 112b. The host UIC module 116 further fetches the data frames from the host UIC Tx buffer 112b and sends the fetched data frames to the host MPHY module 116a. The host MPHY module 116a further transmits the received data frames to the device MPHY module 126a.

Within the UFS device 104, the device UIC module 126 receives the data frames from the device MPHY module 126a. Upon determining that the device UIC Rx buffer 120a is full and/or not available, the device UIC module 126 drops the data frames that cannot be stored in the device UIC Rx buffer 120a. Further, the device UIC module 126 sends the NAK for the dropped data frames to the device MPHY module 126a. The device MPHY module 126a transmits the NAK to the host MPHY module 116a. The host UIC module 126 receives the NAK from the host MPHY module 116a and identifies the dropped data frames. Further, the host UIC module 126 re-transmits the data frames staring from which last AFC was received, e.g. staring from the dropped data frames, to the device MPHY module 126a, using the host MPHY module 116a. On the UFS device 104, the device UIC module 126 obtains the re-transmitted data frames from the device MPHY module 126a and stores the obtained data frames in the device UIC Rx buffer 120a (if the space is available).

As a non-limiting example, suppose the UFS host 102 transmits fifteen data frames to the UFS device 104. Within the UFS device 104, the device UIC module 116 stores thirteen data frames in the device UIC Rx buffer 120a and sends AFC for all thirteen data frames. The device UIC module 126 drops fourteenth and fifteenth data frames upon determining that the device UIC Rx buffer 120a is full. Further, the device UIC module 126 transmits the NAK to the UFS host 102. Upon receiving the NAK, the UFS host 102 re-transmits the fourteenth and fifteenth data frames to the UFS device 104.

Figure 4:
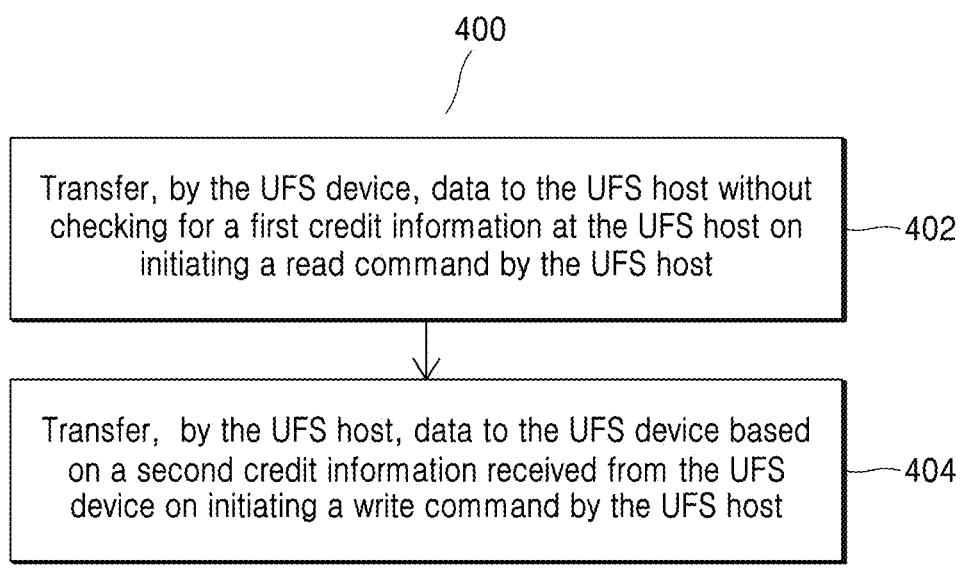
FIG. 4 is a flow diagram illustrating a method for managing data transfer between the UFS host and the UFS device with low power consumption, according to example embodiments.

FIG. 4 is a flow diagram illustrating a method for managing the data transfer between the UFS host 102 and the UFS device 104, according to some example embodiments.

At step 402, the method includes transferring, by the UFS device 104, the data, e.g. the data frames, to the UFS host 102 without checking the first credit information at the UFS host 102, upon initiating the read command by the UFS host 102. The first credit information includes information about the available size of the host UIC Rx buffer 112a of the host UIC module 116 for storing the data received from the UFS device 104.

At step 404, the method includes transferring, by the UFS host 102, the data to the UFS device 104 based on the second credit information received from the UFS device upon initiating the write command by the UFS host 102. The second credit information includes the information about the specific/pre-defined size of the device UIC Rx buffer 120a of the device UIC module 126 for storing the data received from the UFS host 102, wherein the specific/pre-defined size of the device UIC Rx buffer 120a corresponds to and/or is associated with the maximum size defined by the specification supported by the UFS system 100.

The various actions, acts, blocks, steps, or the like in the method and the flow diagram 400 may be performed in the order presented, in a different order, or simultaneously. Further, in some embodiments, some of the actions, acts, blocks, steps, or the like may be omitted, added, modified, skipped, or the like without departing from the scope of inventive concepts.

FIG. 5A is a flow diagram 500a illustrating a method for performing the read transaction between the UFS host 102 and the UFS device 104 having a reduced power consumption, according to some example embodiments.

At step 502, the method includes receiving, by the UFS device 104, the read command from the UFS host 102 to perform the read transaction. At step 504, the method includes storing, by the UFS device 104, the data frames of the data from the storage to the device buffer 120 based on the received read command. At step 506, the method includes fetching, by the UFS device 104, the data frames from the device buffer 120 for storing the data frames in the device UIC Tx buffer 120b.

At step 508, the method includes transmitting, by the UFS device 104, the plurality of data frames from the device UIC Tx buffer 120b to the UFS host 102 without considering the first credit information from the UFS host 102. Thus, the read transaction may be performed faster and/or with low power consumption.

At step 510, the method includes receiving, by the UFS device 104, the AFC frames from the UFS host 102 in response to transmitting the data frames to the UFS host 102. The AFC frames include at least one of the first credit information or the frame sequence number, wherein the UFS device 104 ignores the first credit information. The UFS device 104 can receive the grouped AFC frames. The UFS device 104 can also receive the grouped AFC frames/AFC frames after transmitting the specified/pre-determined number of data frames to the UFS host 102. The UFS device 104 can further receive the grouped AFC frames/AFC frames based on at least one of the expiry of the timer associated with the UFS host 102 or determining that the credit size exceeds the AFC credit threshold. The credit size may be or may correspond to a difference between the available credit information and the send credit information.

The various actions, acts, blocks, steps, or the like in the method and the flow diagram 500a may be performed in the order presented, in a different order, or simultaneously. Further, in some embodiments, some of the actions, acts, blocks, steps, or the like may be omitted, added, modified, skipped, or the like without departing from the scope of inventive concepts.

Figure 5B:
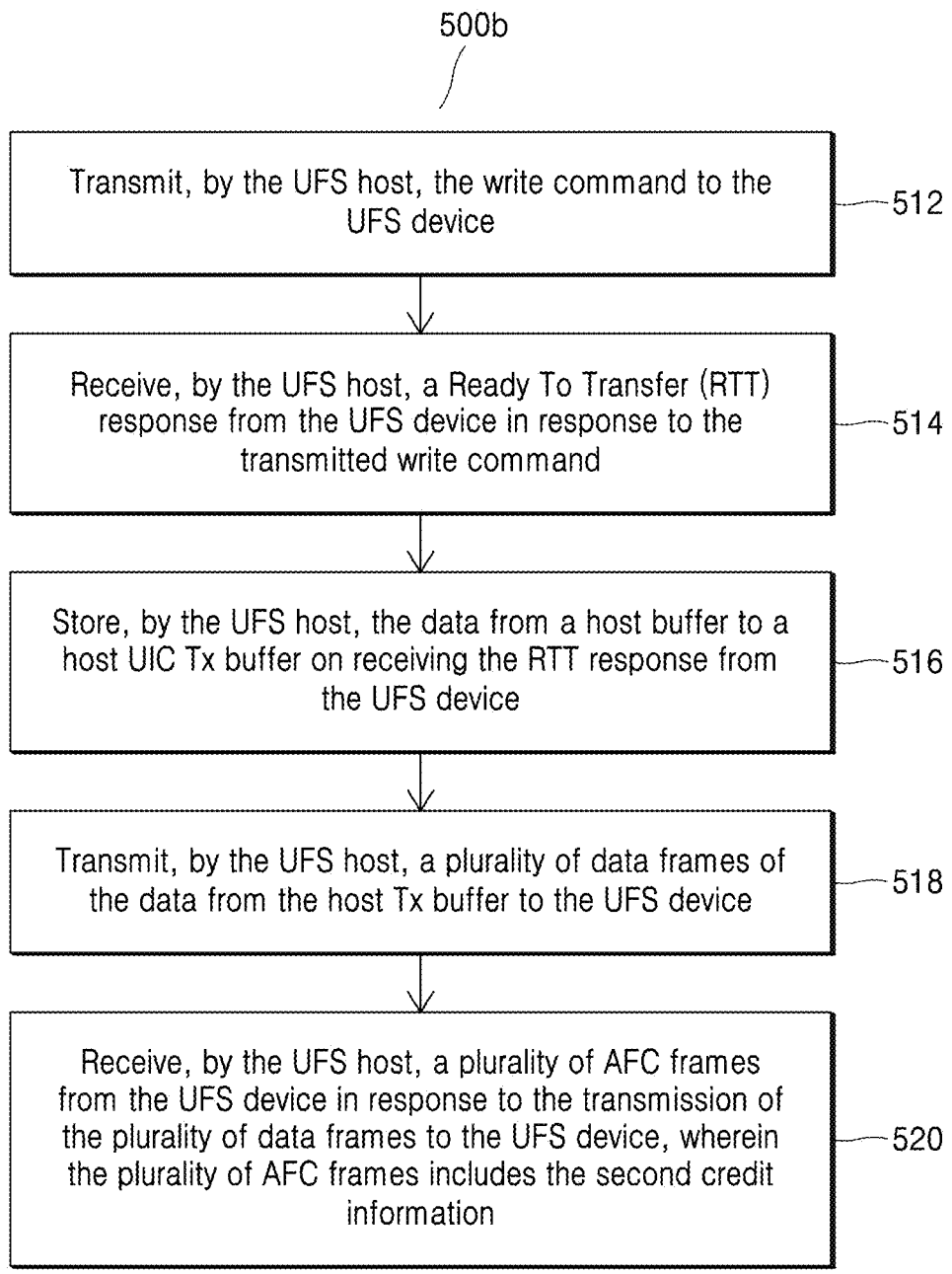
FIG. 5B is a flow diagram illustrating a method for performing the write transaction between the UFS host and the UFS device with reduced power consumption, according to example embodiments.

FIG. 5B is a flow diagram 500b illustrating a method for performing the write transaction between the UFS host 102 and the UFS device 104, according to example embodiments.

At step 512, the method includes transmitting, by the UFS host 102, the write command to the UFS device 104. At step 514, the method includes receiving, by the UFS host 102, the RTT response from the UFS device 104 in response to the transmitted write command. At step 516, the method includes storing, by the UFS host 102, the data frames of the data from the host buffer 112 to the host UIC Tx buffer 112*b* upon receiving the RTT response from the UFS device 104. At step 518, the method includes transmitting, by the UFS host 102, the data frames from the host UIC Tx buffer 112*b* to the UFS device 104.

At step 520, the method includes receiving, by the UFS host 102, the AFC frames from the UFS device 104 in response to the transmission of the data frames to the UFS device 104, wherein the AFC frames include the second credit information. The UFS host 102 may receive the AFC frames faster from the UFS device, since the UFS device 104 is not required to and/or does not calculate the second credit information after reception of each data frame. Thus, the write transaction may be performed between the UFS host 102 and the UFS device 104, which may reduce power consumption.

The various actions, acts, blocks, steps, or the like in the method and the flow diagram 500*b* may be performed in the order presented, in a different order, or simultaneously. Further, in some embodiments, some of the actions, acts, blocks, steps, or the like may be omitted, added, modified, skipped, or the like without departing from the scope of inventive concepts.

Figure 6A:
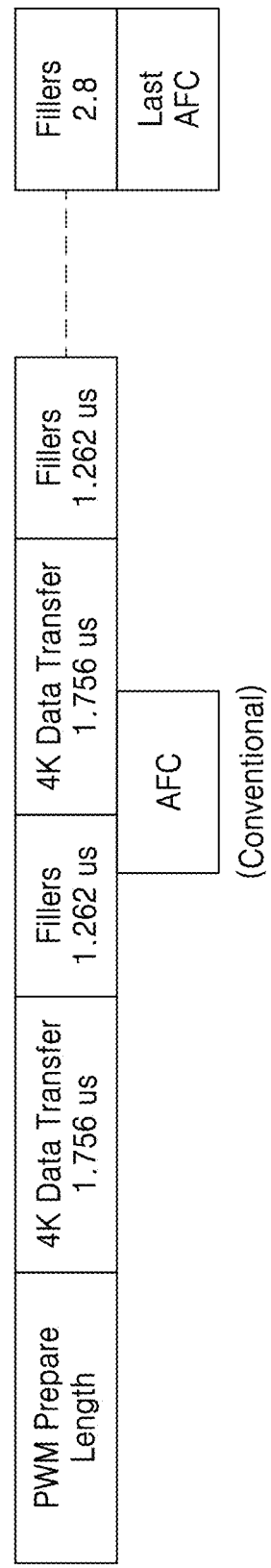
FIGS. 6A, 6B, and 6C are example diagrams illustrating power consumption due to the data transfer between the UFS host and the UFS device.
Figure 6B:
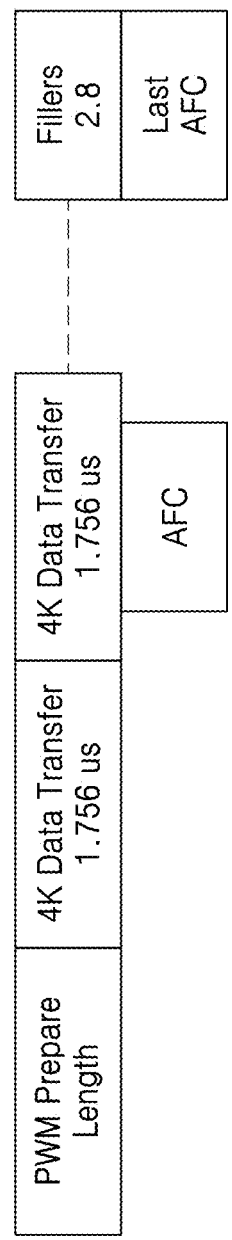
Figure 6C:
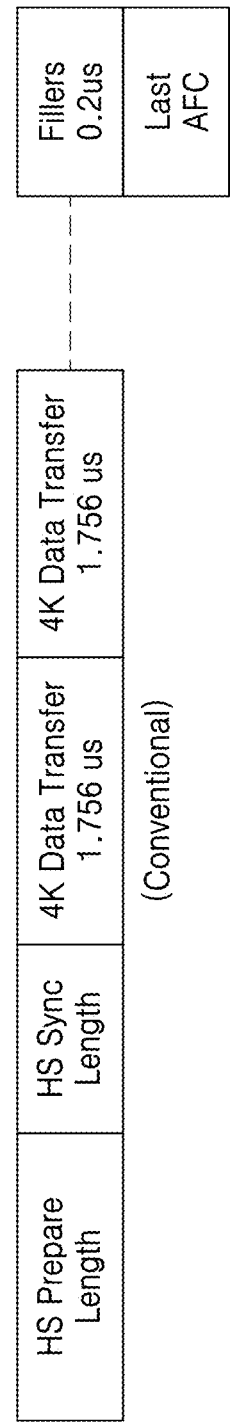

FIGS. 6A, 6B and 6C are example diagrams illustrating a potential reduction of power consumption due to the data transfer between the UFS host 102 and the UFS device 104 without checking for the available credit information, according to example embodiments.

FIG. 6A illustrates data transfer between a UFS host 102 and a UFS device 104 using available credit information, e.g. an available size of respective buffer, in a conventional UFS system. As illustrated in FIG. 6*a*, in the conventional UFS system, the data between the UFS host 102 and the UFS device 104 can be transferred with, e.g., High Speed Gear 4 (HSG4)-2 lanes at 11660 Mbps per lane. The AFC frames can be transferred with Pulse Width Modulation (PWM) G4 lanes at 72 Mbps per lane. Further, the data can be transferred between the UFS host 102 and the UFS device 104 using the available credit information. However, the data transfer using the available credit information, as illustrated in FIG. 6*a*, consumes more time.

FIG. 6B illustrates the data transfer from the UFS device 104 to UFS host 102 without checking for the available credit information, according to example embodiments. In some example embodiments herein, the data can be transferred between the UFS device 104 to UFS host 102 with HSG4-2 lanes a t 11660 Mbps per lane and the AFC frames can be transferred with PWM G4 2 Lanes at 72 Mbps per lane. Example embodiments herein enable the data transfer between the UFS device 104 to UFS host 102 without checking for the available credit information of the host UIC Rx buffer. Thus, the data transfer can be performed without any delay, which in turn may reduce the power consumption and may enable faster data transfer.

FIG. 6C illustrates data transfer between the UFS host 102 and the UFS device 104 using available credit information, e.g. an available size of respective buffer memory in the conventional UFS system. In an example herein, the data can be transferred between the UFS host 102 and the UFS device 104 with HSG4-2 lanes at 11660 Mbps per lane and the AFC frames can be transferred with HSG1 1 Lanes at 1457.6 Mbps per lane. Further, the data can be transferred between the UFS host 102 and the UFS device 104 using the available credit information. However, the data transfer using the available credit information (as illustrated in FIG. 6*c*) increases power consumption.

In contrast, some example embodiments herein enable the data transfer between the UFS device 104 to UFS host 102 without checking for the available credit information of the UFS host UIC Rx buffer. Thus, power consumption may be reduced (as illustrated in FIG. 6*b*).

The embodiments disclosed herein can be implemented through at least one software program running on at least one hardware device and performing network management functions to control the elements. Any of, or all of, elements shown in FIGS. 1-3 can be or include at least one of a hardware device, or a combination of hardware device and software module.

Any of, or all of, elements shown in FIGS. 1-3 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The embodiments disclosed herein describe methods and systems for managing communication between a Universal Flash Storage (UFS) host and a UFS device. Therefore, it is understood that the scope of the protection is extended to such a program, and, in addition to a computer readable means having a message therein, such computer readable storage contain program code for implementation of one or more steps of the method, when the program runs on a server or mobile device or any suitable programmable device. The method is implemented in example embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively or additionally, inventive concepts may be implemented on different hardware devices, e.g. using a plurality of CPUs.

The foregoing description of the specific embodiments will so fully reveal the general nature of the embodiments herein that others can readily modify and/or adapt for various applications such specific embodiments without departing from the generic concepts, and, therefore, such adaptations and/or modifications should and are intended to be comprehended within the meaning and range of equivalents of the disclosed embodiments. It is to be understood that the phraseology or terminology employed herein is for the purpose of description and not of limitation. Therefore, while example embodiments herein have been described in terms of embodiments, those of ordinary skill in the art will recognize that the embodiments herein can be practiced with modification within the spirit and scope of example embodiments as described herein.

What is claimed is:

1. A method for managing data transfer from a Universal Flash Storage (UFS) device to a UFS host, the method comprising:

receiving, at the UFS device, a read command sent from the UFS host, the read command including a command to read data stored at the UFS device;

transferring a frame of the read data from the UFS device to the UFS host based on bypassing a check of first credit information including information about an available size of a host UFS Interconnect (UIC) reception (Rx) buffer of a host UIC module of the UFS host, the transferring in response to the read command from the UFS host; and receiving, at the UFS device from the UFS host, a first acknowledgement (AFC) frame, the first AFC frame including the first credit information, the first credit information including the information about the available size of the host UIC Rx buffer.

2. The method of claim 1, further comprising: receiving, at the UFS device from the UFS host, write data in response to a write command received from the UFS host, and in response to second credit information sent in a second acknowledgement (AFC) frame by the UFS device to the UFS host.

3. The method of claim 2, wherein the second credit information includes,
information about a size of a device UIC Rx buffer of a device UIC module of the UFS device, the UIC Rx buffer configured to store the write data received from the UFS host, the size of the device UIC Rx buffer associated with a maximum size defined by a UFS system with which the UFS device is associated.

4. The method of claim 1, wherein the transferring the read data to the UFS host includes:
receiving the read command at the UFS device, the read data stored in a device buffer of the UFS device based on the received read command;
fetching the read data from the device buffer and storing in a device UIC Transmission (Tx) buffer;
transmitting a plurality of data frames of the read data from the device UIC Tx buffer to the UFS host, the transferring the plurality of data frames not being based on the first credit information from the UFS host; and
receiving a plurality of acknowledgement (AFC) frames from the UFS host in response to the transmitting the plurality of data frames to the UFS host.

5. The method of claim 4, wherein,
the plurality of AFC frames includes at least one of the first credit information or a frame sequence number,
the plurality of AFC frames are grouped into at least one AFC frame group, and
the first credit information is ignored by the UFS device.

6. The method of claim 4, wherein the UFS device is configured to receive from the UFS host at least one of the plurality of AFC frames or the at least one AFC frame group, the receiving from the UFS host being after transmitting a number of data frames of the plurality of data frames to the UFS host.

7. The method of claim 4, wherein the UFS device is configured to receive at least one of the plurality of AFC frames or the at least one AFC frame group from the UFS host based on at least one of (i) expiry of a timer associated with the UFS host or (ii) a determination that a credit size exceeds an AFC credit threshold, the credit size associated with a difference between an available credit size at the host UIC Rx buffer and sent credit information.

8. The method of claim 4, further comprising:
receiving, at the UFS device, a Negative Acknowledgement (NAK) from the UFS host for at least one data frame, the NAK being received in response to the transmission of the plurality of data frames to the UFS host, and the NAK indicating the host UIC Rx buffer at the UFS host is unavailable; and
re-transmitting, by the UFS device, the at least one data frame to the UFS host based on the received NAK.

9. The method of claim 2, wherein receiving the write data from the UFS host includes:
receiving the write command from the UFS host;
transmitting a Ready To Transfer (RTT) response to the UFS host in response to the received write command;
receiving a plurality of data frames of the write data; and
transmitting a plurality of AFC frames to the UFS host in response to the receipt of the plurality of data frames, wherein the plurality of AFC frames include the second credit information.

10. The method of claim 9, further comprising:
transmitting a NAK to the UFS host for at least one data frame of the plurality of data frames in response to the receipt of the plurality of data frames from the UFS host, the NAK being transmitted in response to the device UIC Rx buffer at the UFS device being unavailable; and
re-receiving, from the UFS host, the at least one data frame based on the transmitted NAK.

11. A Universal Flash Storage (UFS) system comprising:
a UFS host; and
a UFS device, wherein,
the UFS device is configured to,
transfer read data to the UFS host upon receipt of a read command received from the UFS host, the read command including a command to read data stored at the UFS device,
transfer a frame of the read data to the UFS host based on bypassing a check of first credit information including information about an available size of a host UFS Interconnect (UIC) Reception (Rx) buffer of a host UIC module of the UFS host, the transferring in response to the read command from the UFS host,
receive a first acknowledgement (AFC) frame, the first AFC frame including the first credit information, the first credit information including the information about the available size of the host UIC Rx buffer of the host UIC module of the UFS host.

12. The UFS system of claim 11, wherein the UFS host is configured to transfer write data to the UFS device, the write data transferred in response to second credit information received from the UFS device in a second acknowledgement (AFC) frame, the write data associated with a write command sent from the UFS host.

13. The UFS system of claim 12, wherein the second credit information includes information about a size of a device UIC Reception (Rx) buffer of a device UIC module, the UIC Rx buffer configured to store the write data received from the UFS host, the size of the device UIC Rx buffer associated with a maximum size defined by the UFS system.

14. The UFS system of claim 11, wherein the UFS device is further configured to:
receive the read command from the UFS host;
store the read data at a device buffer of the UFS device based on the received read command;
fetch the read data from the device buffer and store the read data in a device UIC Transmission (Tx) buffer;
transmit a plurality of data frames of the read data from the device UIC Tx buffer to the UFS host, the transmitting not being based on the first credit information from the UFS host; and receive a plurality of acknowledgement (AFC) frames from the UFS host in response to transmitting the plurality of data frames to the UFS host.

15. The UFS system of claim 14, wherein,
the plurality of AFC frames include at least one of the first credit information or a frame sequence number,
the plurality of AFC frames are grouped into at least one AFC frame group, and
the first credit information is ignored by the UFS device.

16. The UFS system of claim 14, wherein the UFS device is configured to receive at least one of the plurality of AFC frames or the at least one AFC frame group from the UFS host after transmitting a number of data frames of the plurality of data frames to the UFS host.

17. The UFS system of claim 14, wherein the UFS device is configured to receive at least one of the plurality of AFC frames or the at least one AFC frame group from the UFS host based on at least one of (i) expiry of a timer associated with the UFS host or (ii) a determination that a credit size exceeds an AFC credit threshold, the credit size associated with a difference between an available credit size at the host UIC Rx buffer and a send credit information.

18. The UFS system of claim 14, wherein the UFS device is further configured to:
receive a Negative Acknowledgement (NAK) sent from the UFS host for at least one data frame in response to the transmission of the plurality of data frames to the UFS host, the NAK being received in response to the host UIC Rx buffer at the UFS host being unavailable; and
re-transmit the at least one data frame to the UFS host based on the received NAK.

19. The UFS system of claim 12, wherein the UFS host is further configured to:
transmit the write command to the UFS device;
receive a Ready To Transfer (RTT) response from the UFS device in response to the transmitted write command;
storing the write data at a host UIC Tx buffer upon receiving the RTT response from the UFS device;
transmit a plurality of data frames of the write data from the host Tx buffer to the UFS device; and
receive a plurality of AFC frames from the UFS device in response to the transmission of the plurality of data frames to the UFS device, wherein
the plurality of AFC frames include the second credit information.

20. The UFS system of claim 19, wherein the UFS host is further configured to:
receive a NAK from the UFS device for at least one data frame of the plurality of data frames in response to the transmission of the plurality of data frames to the UFS device, the NAK being received in response to the device UIC Rx buffer at the UFS device being unavailable; and
re-transmit the at least one data frame to the UFS device based on the received NAK.

* * * * *